United States Patent [19]

Shinohara et al.

[11] Patent Number: 5,444,353
[45] Date of Patent: Aug. 22, 1995

[54] BATTERY CHARGER

[75] Inventors: Shigeru Shinohara; Nobuhiro Takano, both of Katsuta, Japan

[73] Assignee: Hitachi Koki Co., Ltd., Tokyo, Japan

[21] Appl. No.: 77,051

[22] Filed: Jun. 16, 1993

[30] Foreign Application Priority Data

Jun. 16, 1992 [JP] Japan ................ 4-156676
Apr. 20, 1993 [JP] Japan ................ 5-093081

[51] Int. Cl.$^6$ ............................................. H02J 7/00
[52] U.S. Cl. ........................................ 320/39; 320/22; 320/43
[58] Field of Search .................... 320/39, 22, 43, 48

[56] References Cited

U.S. PATENT DOCUMENTS

| | | | |
|---|---|---|---|
| 4,745,349 | 5/1988 | Palanisamy et al. | 320/22 |
| 4,746,852 | 5/1988 | Martin | 320/20 |
| 5,032,825 | 7/1991 | Kuznicki | 340/636 |
| 5,304,916 | 4/1994 | Le et al. | 320/23 |

Primary Examiner—Steven L. Stephan
Assistant Examiner—Robert Nappi
Attorney, Agent, or Firm—Sughrue, Mion, Zinn, Macpeak & Seas; Richard C. Turner; Marie-Claire Boisvert

[57] ABSTRACT

A status of a battery is detected to determine whether an amount of residual charge is large or not. Detection of the status of the battery is performed on the basis of a change in the voltage level over a preliminary charge time. If the battery is determined to at low charge, then a sleep time is set. The full charge condition of the battery is, for example, detected when a second order differential of the voltage across the battery becomes negative. However, the computation of the second order differential is not performed during the sleep time. Further, to accurately determine the status of the battery, the duration of the preliminary charge time is prolonged if the battery is detected to have been deeply discharged.

24 Claims, 10 Drawing Sheets

BATTERY CHARGER

BACKGROUND OF THE INVENTION

1. Field of the Invention

The present invention relates to a battery charger for charging rechargeable batteries such as nickel-cadmium battery (hereinafter referred to as "Ni—Cad battery").

2. Description of the Related Art

Various battery chargers for charging rechargeable batteries have heretofore been proposed. Generally, battery chargers detect the full charge condition and stop charging when the full charge condition has been detected. However, due to variation in the amount of residual charge in the battery, the full charge condition is occasionally detected in error. Some batteries such as Ni—Cad batteries are capable of being charged at a rapid rate but are easily damaged or destroyed if a high charge current is continued after a full charge condition has been reached. If, on the other hand, the charge was stopped before the full charge condition has been reached, the battery is undercharged.

The same problem occurs in universal battery chargers capable of charging various types of batteries if the number of cells making up of the battery is erroneously detected. Detection of the number of cells is necessary to determine the voltage up to which the battery is charged. If the detected number of cells is smaller than the actual number, the battery will be overcharged whereas if the detected number of cells is larger than the actual number, the battery will be undercharged.

SUMMARY OF THE INVENTION

The present invention has been made to solve the above-described problems, and it is accordingly an object of the present invention to provide a battery charger capable of accurately charging a battery up to a full charge condition.

Another object of the invention is to provide a universal battery charger capable of accurately identifying a number of cells making up of the battery, wherein the battery can be fully charged depending on the number of cells thus identified.

To achieve the above and other objects, the present invention provides a battery charger for charging a rechargeable battery, comprising (a) charge current supplying means, (b) voltage detecting means, (c) battery status detecting means, and (d) control means. The charge current supplying means supplies a charge current to the battery. The voltage detecting means detects a voltage across the battery and outputs a battery voltage signal indicative of the voltage across the battery. The battery status detecting means detects a status of the battery as to whether the battery is at low charge or at high charge. The battery status detecting means detects the status of the battery based on a reference voltage and a first battery voltage signal indicative, of the voltage across the battery at a time after expiration of a predetermined period of time from a start of charge. The control means controls the charge of the battery based on the status of the battery voltage detected by the battery status detecting means. The control means has full charge detection means for detecting that the battery has reached a full charge condition based on the voltage indicated by the battery voltage signal. The control means stops charging when the full charge condition is detected by the full charge detection means.

In one example, the reference voltage is a voltage across the battery detected by the voltage detecting means at the start of charge. The battery status detecting means computes a change in the voltage across the battery over the predetermined period of time and determines that the battery is at low charge when the change in the voltage across the battery is equal to or smaller than a predetermined value and that the battery is at high charge when the change in the voltage across the battery is larger than the predetermined value.

In another example, the reference voltage is a predetermined fixed value. In this case, the battery status detecting means determines that the battery is at low charge when the voltage indicated by the first battery voltage signal is lower than the predetermined fixed value and that the battery is at high charge when the voltage indicated by the first battery voltage signal is higher than the predetermined fixed value.

According to another aspect of the invention, there is provided (a) a charge current supply means, (b) voltage detecting means, (c) first battery status detecting means, (d) second battery status detecting means, (e) time adjusting means, and (f) control means. The charge current supplying means supplies a charge current to the battery. The voltage detecting means detects a voltage across the battery and outputs a battery voltage signal indicative of the voltage across the battery. The first battery status detecting means detects a status of the battery as to whether or not the battery has been deeply discharged. The battery status detecting means detects the status of the battery based on a reference voltage and a first battery voltage signal indicative of the voltage across the battery at a time before the charge current is supplied to the battery by the charge current supplying means. The second battery status detecting means detects a status of the battery as to whether the battery is at low charge or at high charge. The second battery status detecting means detects the status of the battery based on a reference voltage and a first battery voltage signal indicative of the voltage across the battery at a time after expiration of a preliminary charge time from a start of charge. The time adjusting means adjusts a duration of the preliminary charge time in accordance with the status of the battery detected by the first status detecting means. The control means controls the charge of the battery based on the status of the battery detected by the second battery status detecting means. The control means has full charge detection means for detecting that the battery has reached a full charge condition based on the voltage indicated by the battery voltage signal. The control means stops charging when the full charge condition is detected by the full charge detection means.

When the first status detecting means detects that the battery has not been deeply discharged, the preliminary charge time is set to a first duration. When the first status detecting means detects that the battery has been deeply discharged, the duration of the preliminary charge time is set to a second duration longer than the first duration.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

Figure 1:
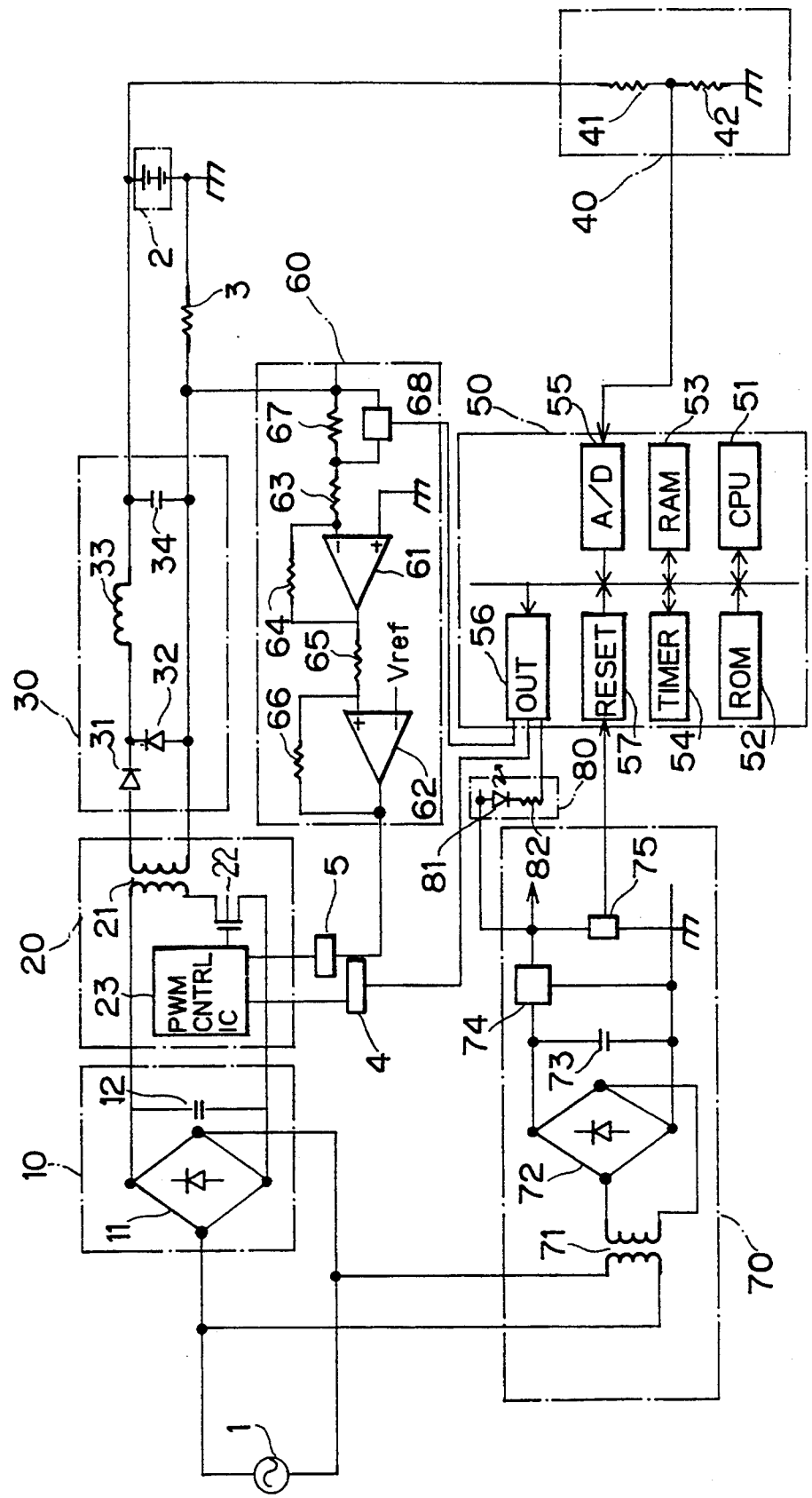
FIG. 1 is a circuit diagram showing a hardware arrangement of the battery charger according to the present invention.

A hardware arrangement of the battery charger according to the present invention will firstly be described with reference to FIG. 1.

To charge a rechargeable battery 2 with the battery charger shown in FIG. 1, the battery 2 is connected between a rectifying/smoothing circuit 30 (to be described later) and ground. The battery 2 consists of a plurality of cells connected in series.

The battery charger includes a resistor 3 serving as a current detecting means for detecting a charging current flowing in the battery 2. A rectifying/smoothing circuit 10 is connected to an A.C. power source 1 for converting the A.C. voltage to D.C. voltage. The circuit 10 includes a full-wave rectifier 11 and a smoothing capacitor 12. A switching circuit 20 is connected to the output of the rectifying/smoothing circuit 10 and includes a high frequency transformer 21, a MOSFET 22, and a PWM (pulse width modulation) controlling IC 23. This IC 23 changes the width of driving pulses applied to the MOSFET 22. With the switching actions performed by the MOSFET 22, pulsating voltage is developed at the secondary side of the transformer 21. Another rectifying/smoothing circuit 30 is connected to the output of the switching circuit 20. The circuit 30 includes diodes 31, 32, a choke coil 33 and a smoothing capacitor 34. A battery voltage detecting means 40 is connected in parallel to the battery 2 and is made up of two resistors 41 and 42 connected in series so that the voltage across the battery 2 is divided with a ratio of resistances of the two resistors. The output of the battery voltage detecting means 40 is taken out from the junction of the resistors 41 and 42.

The battery charger further includes a one chip microcomputer 50 having a CPU 51, ROM 52, RAM 53, a timer 54, an A/D converter 55, an output port 56, and a reset input port 57 which are mutually connected by a bus. A charging current controlling means 60 is connected between the current detecting means (resistor) 3 and the switching circuit 20 to maintain the charging current at a predetermined level. The charging current controlling means 60 includes cascade-connected operational amplifiers 61 and 62, resistors 63 through 67, and an analog switch 68 which can be implemented, for example, with CMOSIC No. 4066.

When the charging current is $I_1$, the analog switch 68 is rendered ON in response to a signal fed from the output port 56 of the microcomputer 50, thereby increasing the amplification factor of the first stage operational amplifier 61, whereas when the charging current is increased to $I_2$ ($I_1 < I_2$), the analog switch 68 is rendered OFF in response to a signal fed from the output port 56, thereby decreasing the amplification factor of the first stage operational amplifier 61. A signal transmission means comprising a photo-coupler 5 is connected between the charging current controlling means 60 and the switching circuit 20. Another photo-coupler 4 serving also as a signal transmission means is connected between the microcomputer 50 and the switching circuit 20.

A constant voltage power supply 70 is provided for supplying constant voltages to the microcomputer 50 and the charging current controlling means 60. The constant voltage power supply 70 includes a transformer 71, a full-wave rectifier 72, a smoothing capacitor 73, a three-terminal voltage regulator 74, and a reset IC 75. The reset IC 75 issues a reset signal to the reset input port 57 of the microcomputer 50 to reset the same. A charge display means 80 is connected between the constant power supply 70 and the output port 56 of the microcomputer 50 for indicating the progress of charging of the battery 2. The charge display means 80 includes an ED 81 and a resistor 82.

Now, a first embodiment of the present invention will be described. The first embodiment is directed to charging Ni—Cad batteries, in which $\Delta^2 V$ detection method is used to determine the full charge condition of the battery. In the $\Delta^2 V$ detection method, the battery is judged to be fully charged when the second order differential of the charging characteristic becomes negative.

Figure 3:
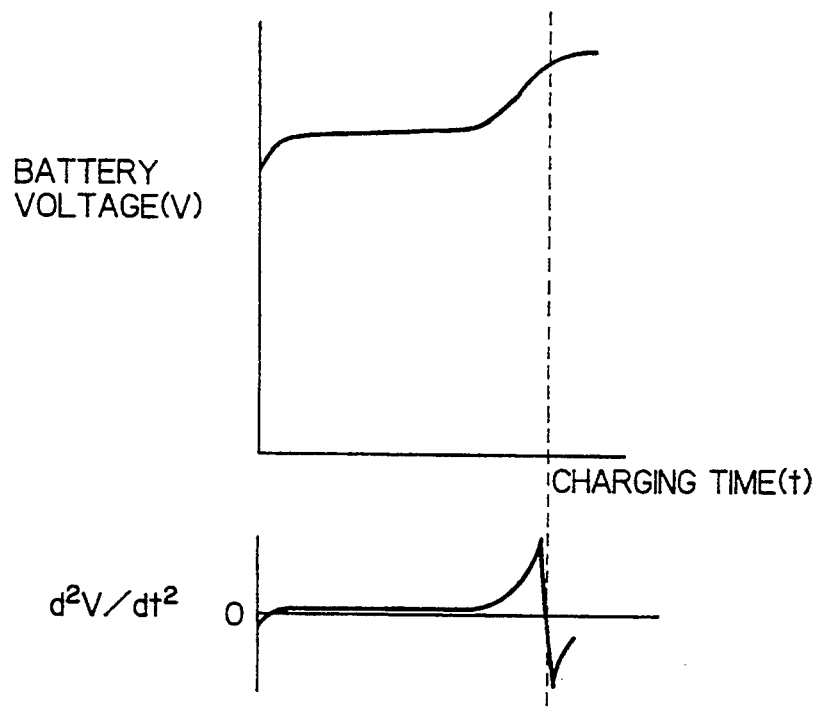
FIG. 3 is a graphical representation showing a charge characteristic of a battery of low charge and also a second order differential curve of the charge characteristic.
Figure 4:
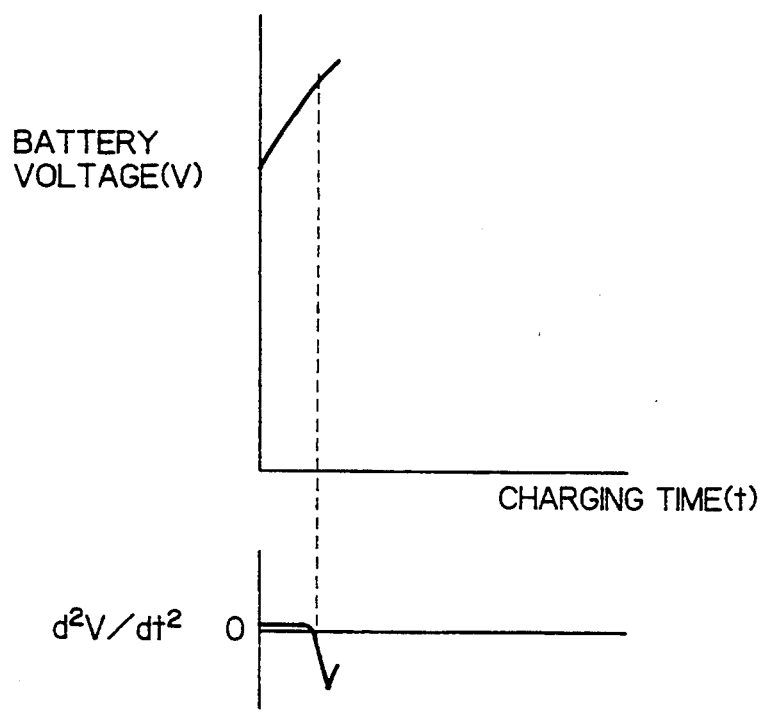
FIG. 4 is a graphical representation showing a charge characteristic of a battery of high charge and also a second order differential curve of the charge characteristic.

Ni—Cad batteries exhibit two types of charging characteristics depending on whether the battery is high or low in the level of charge in its status prior to charging. FIG. 3 shows a charging characteristic and its second order differential curve of a Ni—Cad battery of low charge. As shown, the second order differential of the charging characteristic becomes negative twice. The first negative appears immediately after the start of charge and the second negative appears at the time when the full charge condition is reached. The smaller the initial charge level of the battery, the more obvious the first negative. On the other hand, a Ni—Cad battery of high charge exhibits a charging characteristic as shown in FIG. 4. In this case, the second order differential of the charging characteristic becomes negative only once at the time of full charge. If the charge of the battery is stopped when the first negative is detected, the battery of high charge will be adequately charged but the battery of low charge will little be charged. One solution to adequately charge the battery of low charge is setting a predetermined duration of sleep time so as not to detect the firstly occurring negative of the second order differential. However, although the battery of low charge will be adequately charged, the battery of high charge would be overcharged as it is fully charged during the sleep time. In view of the foregoing, according to the first embodiment of the invention, the status of the battery as to whether the battery is high charge or low charge is detected and the sleep time is set only when the battery is low charge.

Referring to the hardware arrangement in FIG. 1 and the flow chart in FIG. 2, the operation of the first embodiment will be described.

When the battery charger is powered, the microcomputer 50 prompts the operator to connect the battery 2 and determines if the battery 2 is connected (step 1). Connection of the battery 2 is determined to be made by the microcomputer 50 based on the change in the level of the signal from the battery voltage detecting means 40. Then, the microcomputer 50 issues a charge start signal from the output port 56 to the PWM control IC 23 via the signal transmission means 4 to thereby start the preliminary charge with a current $I_1$ (step 2). The current detecting resistor 3 detects the charging current flowing in the battery 2 and a difference between the detected current level and a reference level is fedback to the PWM control IC 23 through the charging current controlling means 60 and the signal transmission means 5. When the charging current is larger than the reference level, the pulse width from the PWM control IC 23 is narrowed whereas when the charging current is smaller than the reference level, the pulse width is widened. The high frequency transformer 21 performs switching actions in accordance with the pulse width determined by the PWM control IC 23. The pulsating voltage at the output of the switching circuit 20 is converted to a D.C. voltage in the rectifying/smoothing circuit 30. Thus, the battery 2 is charged with a constant current $I^1$ and a feedback control is implemented with a feedback circuit comprising the current detecting resistor 3, the charge current controlling means 60, the signal transmission means 5, the switching circuit 20, and the rectifying/smoothing circuit 30 to maintain the charging current at constant.

Figure 5:
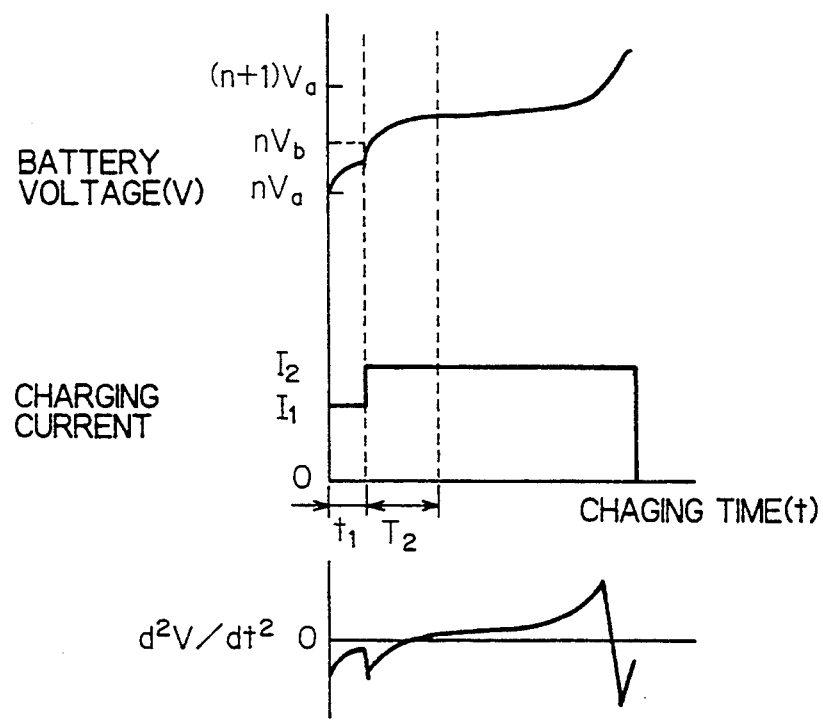
FIG. 5 is a graphical representation showing a charge characteristic of a battery of low charge and also a second order differential curve of the charge characteristic.
Figure 6:
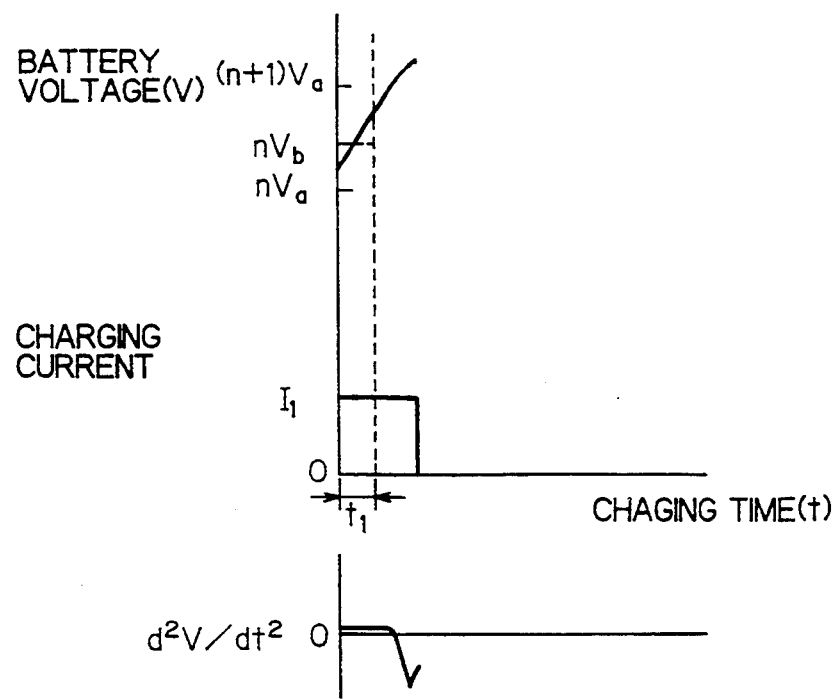
FIG. 6 is a graphical representation showing a charge characteristic of a battery of high charge and also a second order differential curve of the charge characteristic according to the first embodiment of the invention.

To determine the initial status of the battery 2, the microcomputer 50 computes the slope of the progressively increasing battery voltage during a predetermined period of time $t_1$ from the start of charge. The battery 2 is determined so that the amount of residual charge was small at the start of charge, i.e., low charge, if the slope thus computed is equal to or smaller than a predetermined reference level (step 3). If the status of the battery 2 is so determined, a sleep time $T_2$ is set (step 4) and the charging current is increased to $I^2$ to shorten the charging time (step 5) as shown in FIG. 5. During the sleep time $T^2$, computation of the second order differential of the battery voltage is not performed. As a result, the charge of the battery does not stop before it is fully charged. When the determination made in step 3 is "NO" the amount of residual charge in the battery is determined to be large, i.e., high charge. In this case, as shown in FIG. 6, the charge is continued with the charging current $I^1$ to prevent the battery 2 from being overcharged, and the display means 80 is turned on to inform the operator that the charge of the battery will soon be completed (step 6).

Next, the microcomputer 50 implements computation of the second order differential of the battery voltage ($\Delta^2V$). For this purpose, the microcomputer 50 reads the battery voltage Vin at a given interval t (step 7). Specifically, the microcomputer 50 reads the output signal of the battery voltage detecting means 40 and stores the corresponding digital signal in the RAM 53 (step 7). In the subsequent step 8, the previously read battery voltage Vpre is subtracted from the presently read battery voltage Vin to obtain the change of the battery voltage $\Delta$Vin, and further $\Delta$Vpre indicative of the change of the battery voltage as previously computed is subtracted from $\Delta$Vin to obtain $\Delta^2V$ (step 8).

Next, it is determined if the $\Delta^2V$ thus obtained is negative or positive (step 9). If positive, then the presented read battery voltage Vin is renamed to Vpre, and $\Delta$Vin to $\Delta$Vpre (step 10). After expiration of time t ("YES" in step 11), the processing in steps 7 through 9 are again executed. When $\Delta^2V$ is determined to be negative in step 9, the microcomputer 50 issues a charge stop signal to the PWM control IC 23 through the signal transmission means 4 to thereby stop charging (step 12). Thereafter, it is determined if the battery 2 is disconnected (step 13). If so ("NO" in step 13), then the routine returns to step 1 where the battery charger prompts the operator to connect another battery 2 for recharging.

A second embodiment of the invention will next be described. The second embodiment is directed to a universal battery charger capable of charging any type of batteries having different number of cells. In the second embodiment, detection of the full charge is also performed by using the $\Delta^2V$ detection method. However, unlike the first embodiment, determination as to whether the battery is of low charge or high charge is made depending on the level of the voltage that the battery has reached after a preliminary charge for a predetermined period of time.

Figure 8:
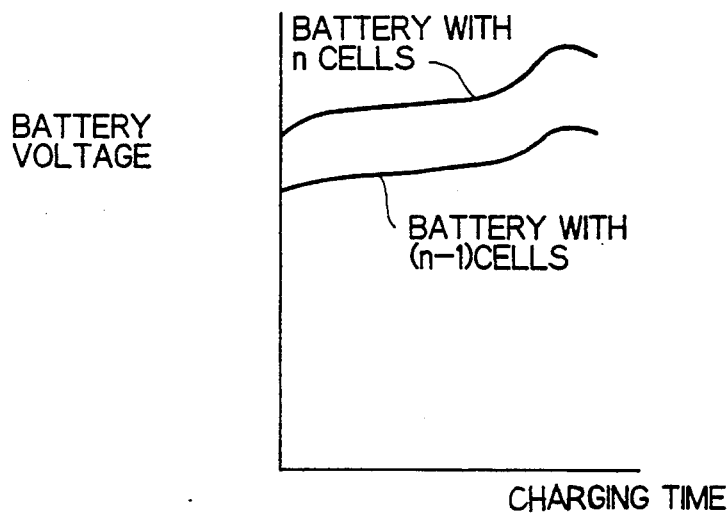
FIG. 8 is a graphical representation showing charge characteristics of batteries having different number of cells.

As can be seen from FIG. 8, the charging characteristic differs depending on the number of cells, so it is necessary that the number of cells be detected accurately in advance to charge a battery with the universal charger. If the number of cells is detected erroneously, the battery will not be properly charged as will be described hereinafter.

Figure 9:
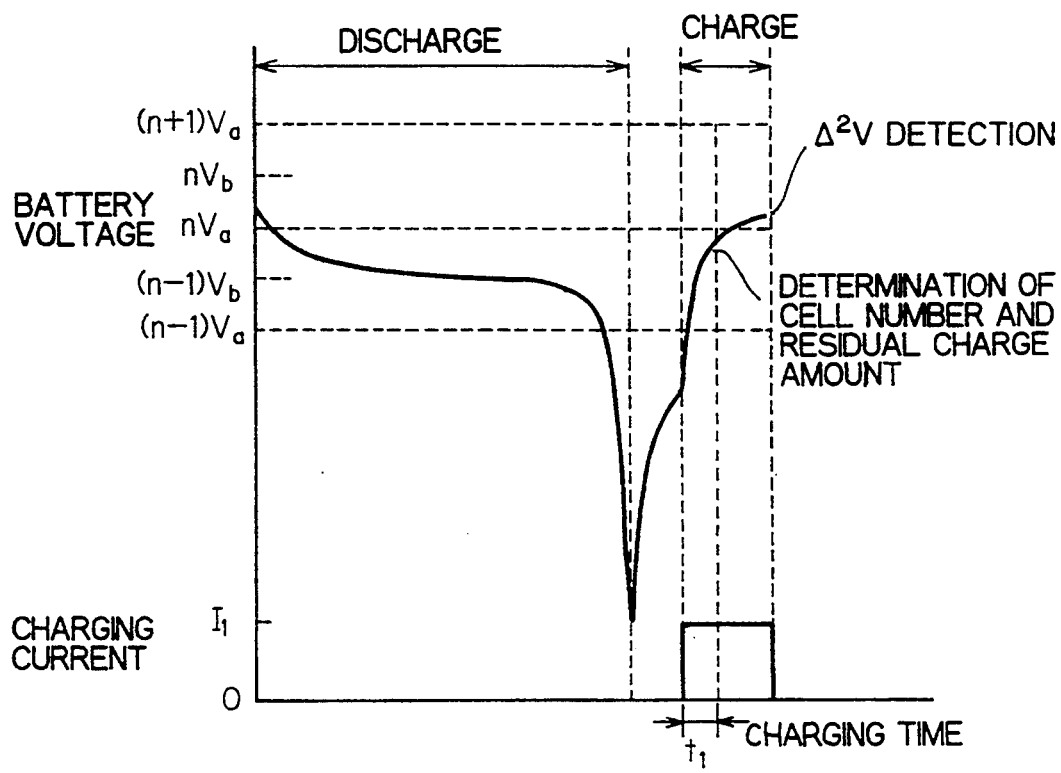
FIG. 9 is a graphical representation showing a charge/discharge characteristic of a battery of low charge.

It is now assumed that a battery having n-number cells has been deeply discharged to near zero level as shown in FIG. 9. To identify the number of cells and to determine whether the battery is of low charge or high charge, the battery is preliminarily charged with a charging current $I^1$ for a duration of time $t_1$. The battery voltage $Vt_1$ reached after expiration of time $t_1$ is successively compared with each of a plurality of threshold values $(n-i)V_a, \ldots, (n-1)V_a, nV_a, (n+1)V_a, \ldots, (n+i)V_a$ set corresponding to the number of cells, and the cell number is determined to be $(n-1)$ which number is smaller by one than the actual cell number. Based on this erroneous result, determination as to whether the battery is of low charge or high charge is made through the comparison of the battery voltage $Vt_1$ with a reference level $(n-1)V_b$ corresponding to the threshold value (n−1) $V_a$. Because the battery voltage $Vt_1$ is above the reference level (n−1)$V_b$, it is determined that the battery is of high charge. As a result, the sleep time is not set, thus the charge of the battery is stopped at a time when the firstly occurring negative of the second order differential is detected. In view of the foregoing, the second embodiment of the invention judges whether the battery has been deeply discharged before the start of charge and the duration of the preliminary charging time is varied so that the number of cell can be accurately identified.

Figure 7A:
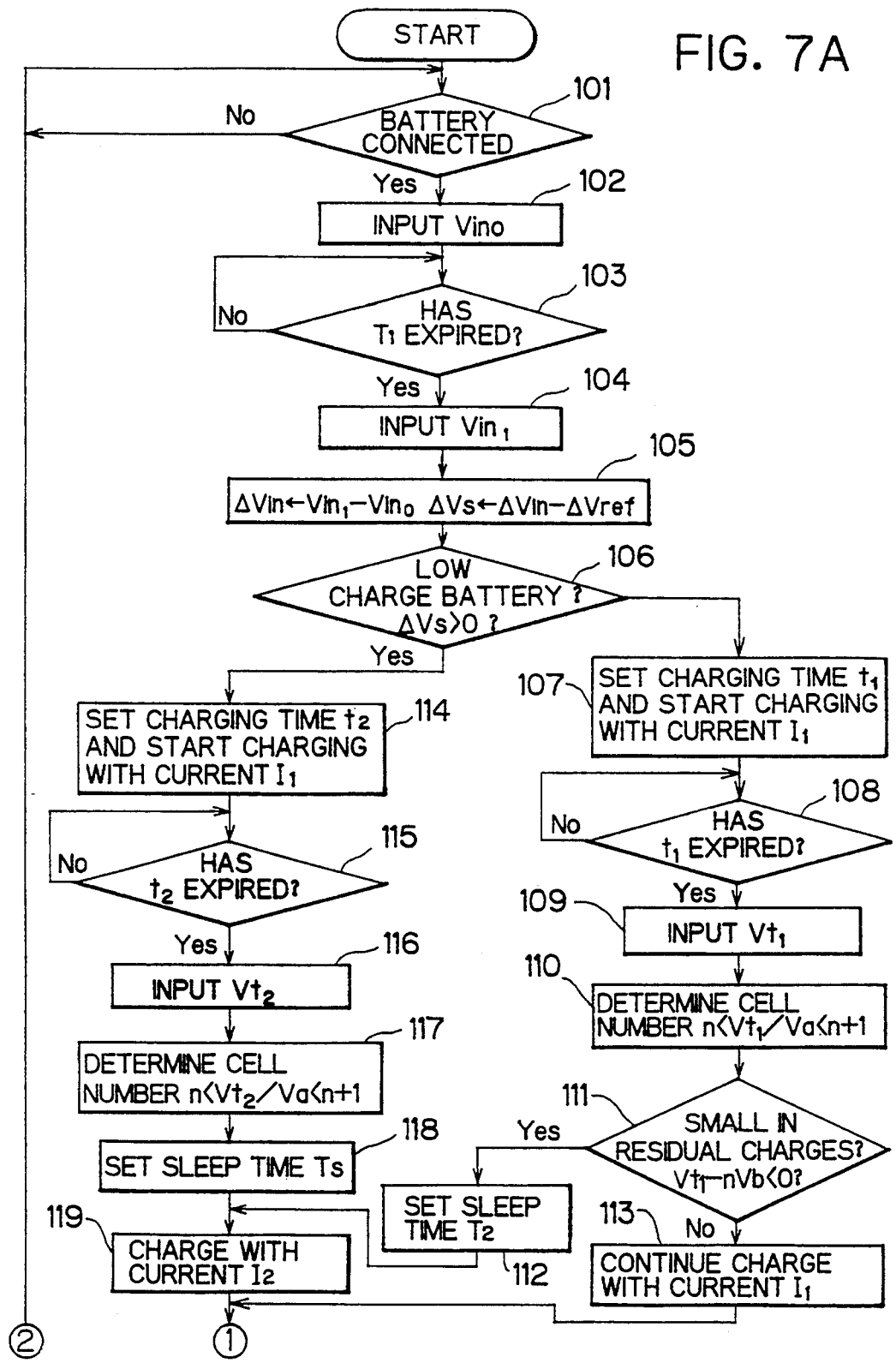
FIGS. 7A and 7B are flow charts for describing an operation of a second embodiment of the present invention.
Figure 7B:
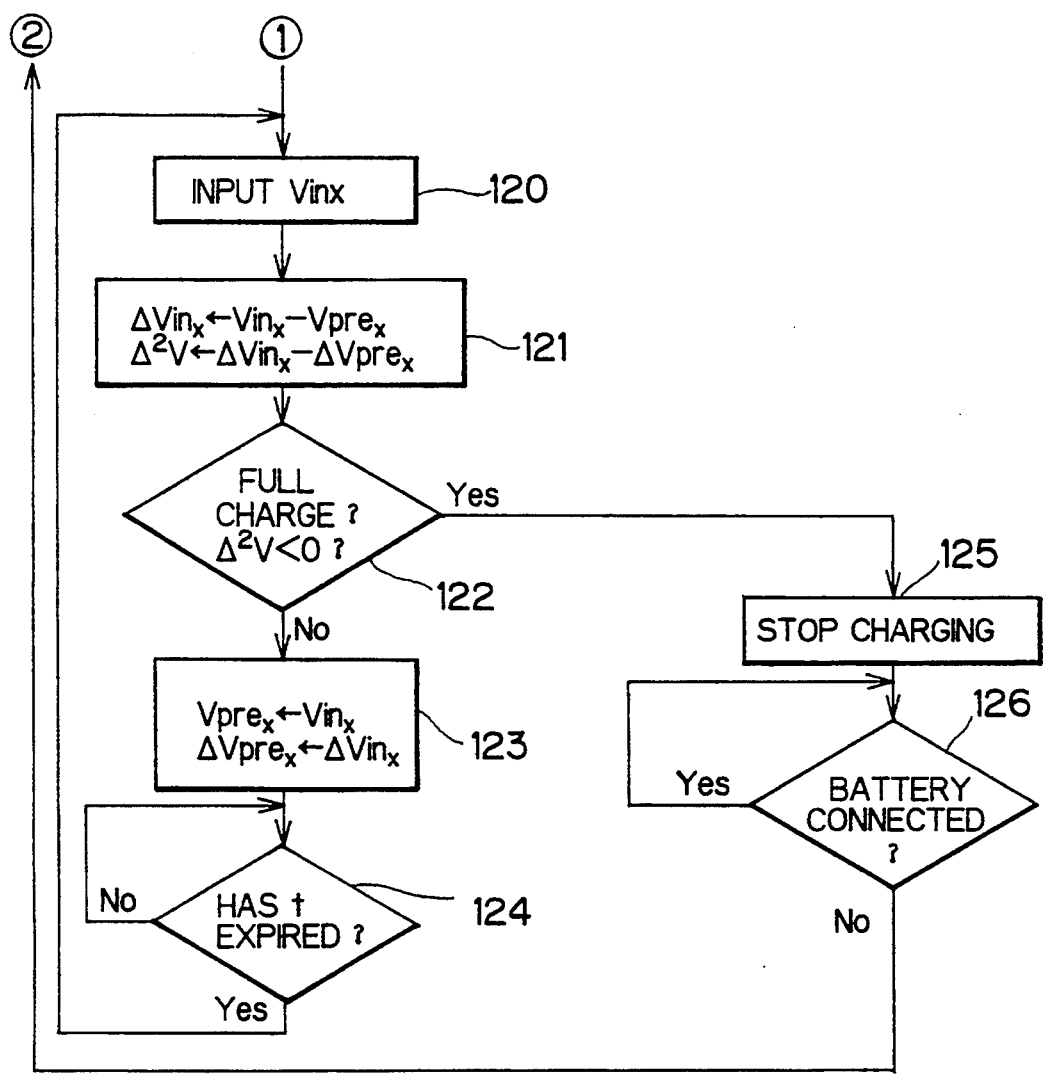

Referring to the flow chart of FIGS. 7A and 7B, when the battery charger is powered, the microcomputer 50 prompts the operator to connect a battery 2 and determines if the battery 2 is connected (step 101). Connection of the battery 2 is determined to be made by the microcomputer 50 based on the change in the level of the signal fed from the battery voltage detecting means 40. To determine the status of the battery 2 to be recharged, the output signal from the battery voltage detecting means 40 is analog-to-digital converted by the A/D converter 55 and the resultant digital signal is inputted as an initial battery voltage Vin0 to the microcomputer 50 (step 102). After expiration of a time $T_1$ ("YES" in step 103 ), the output signal from the battery voltage detecting means 40 is again analog-to-digital converted and the resultant digital signal is inputted as a battery voltage Vin1 to the microcomputer 50 (step 104). Next, a change in the battery voltage ΔVin during time $T_1$ is obtained by subtracting Vin0 from Vin1, and further a reference voltage ΔVref is subtracted from ΔVin to obtain ΔVs (step 105).

Next, determination is made as to whether ΔVs is positive or not (step 106). If ΔVs is negative, the status of the battery is determined so that the battery has been normally discharged or the battery has been remained unused for more than a certain period of time. If the battery is so determined, a preliminary charge time $t_1$ is set. Now, the microcomputer 50 issues a charge start signal from the output port 56 to the PWM control IC 23 via the signal transmission means 4 to thereby start charging with a current $I_1$ (step 107). After the time $t_1$ has expired from the start of charge ("YES" in step 108), the output signal from the battery voltage detecting means 40 is again subjected to analog-to-digital conversion and the resultant digital signal is inputted as a battery voltage $Vt_1$ to the microcomputer 50 (step 109). Then, the battery voltage $Vt_1$ is sequentially compared with each of a plurality of the threshold values (n−i) $V_a$, ..., (n−1) $V_a$, n$V_a$, (n+1) $V_a$, ..., (n+i) $V_a$ set corresponding to the number of cells to determine the number of cells (step 110). Further, whether the battery is of low charge or high charge is detected based on a value obtained by subtracting n$V_b$ from $Vt_1$ (step 111). If the subtracted value is negative, the amount of residual charge in the battery is determined to be small, i.e., low charge, and if so determined a sleep time $T_2$ is set (step 112) and the charging current is increased to $I_2$ as shown in FIG. 5 (step 119). During the sleep time $T_2$, computation of the second order differential is not performed. When the determination made in step 111 is "NO", the amount of residual charge in the battery is determined to be large, i.e., high charge. In this case, as shown in FIG. 6, the charge is continued with the charging current $I_1$ to prevent the battery from being overcharged (step 113).

Figure 10:
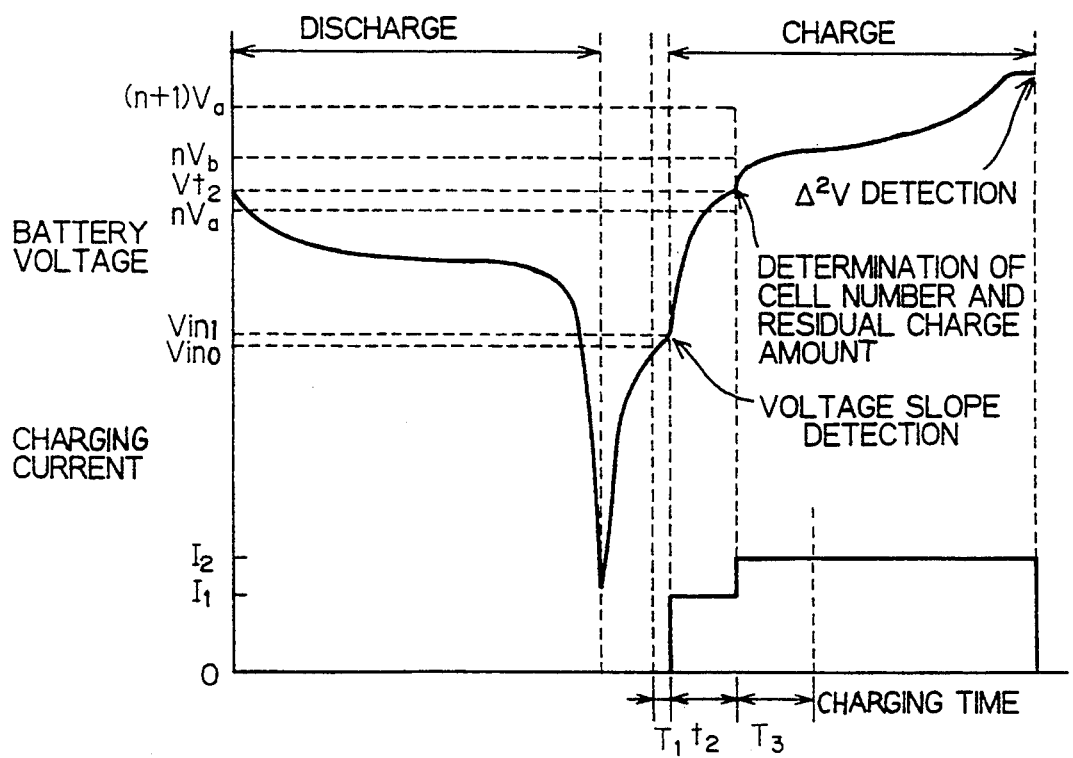
FIG. 10 is a graphical representation showing a charge/discharge characteristic a battery of low charge according to the second embodiment of the invention.

When the determination made in step 106 is "YES", that is, when ΔVs is positive, the battery is determined to be in a condition immediately after a deep discharge. In this case, as shown in FIG. 10, a longer preliminary charge time $t_2$ ($t_2 > t_1$) is set and the charge of the battery is started with the charging current $I_1$ (step 114). After expiration of the preliminary charge time $t_2$ (step 115), the output signal from the battery voltage detecting means 40 is analog-to-digital converted and the resultant digital signal is inputted as a battery voltage $Vt_2$ to the microcomputer 50 compared with each of the plurality of reference levels n$V_a$, (n+1) $V_a$ to determine the number of cells (step 117). Further, a sleep time $T_3$ is set ($T_3 > T_2$) (step 118). At the same time, the charging current is increased to $I_2$ (step 119).

Next, the microcomputer 50 implements computation of the second order differential of the charged voltage across the battery ($\Delta^2V$) now progressing. The output signal from the battery voltage detecting means 40 is applied to the A/D converter 55 for analog-to-digital conversion and the resultant digital signal is inputted as $Vin_x$ to the microcomputer 50 (step 120). In the subsequent step 121, the previously input battery voltage $Vpre_x$ is subtracted from the data $Vin_x$ to obtain $\Delta Vin_x$, and further $\Delta Vpre_x$ indicative of the change of the battery voltage as previously computed is subtracted from $\Delta Vin_x$ to obtain $\Delta^2V$ (step 121). Next, it is determined if the $\Delta^2V$ thus obtained is negative or positive (step 122). If positive, $Vin_x$ is renamed to $Vpre_x$, and $\Delta Vin_x$ to $\Delta Vpre_x$ (step 123). After expiration of time t ("YES" in step 124), the processing in steps 120 through 122 are repeatedly executed. When $\Delta^2V$ is determined to be negative in step 122, the microcomputer 50 issues a charge stop signal to the PWM control IC 23 through the signal transmission means 4 to thereby stop charging (step 125). Thereafter, it is determined if the battery 2 is disconnected (step 126). If so ("NO" in step 126), then the routine returns to step 101 where the battery charger prompts the operator to connect another battery 2 for recharging.

According to the second embodiment, the number of battery cells can be accurately determined and any type of battery can be fully charged irrespective of the status of the battery.

A third embodiment of the present invention will finally be described. Like the second embodiment, the third embodiment is directed to the universal battery chargers. In this embodiment, the full charge condition is detected when the battery voltage has reached a cut-off voltage set slightly lower than the peak value of the battery voltage.

Figure 2:
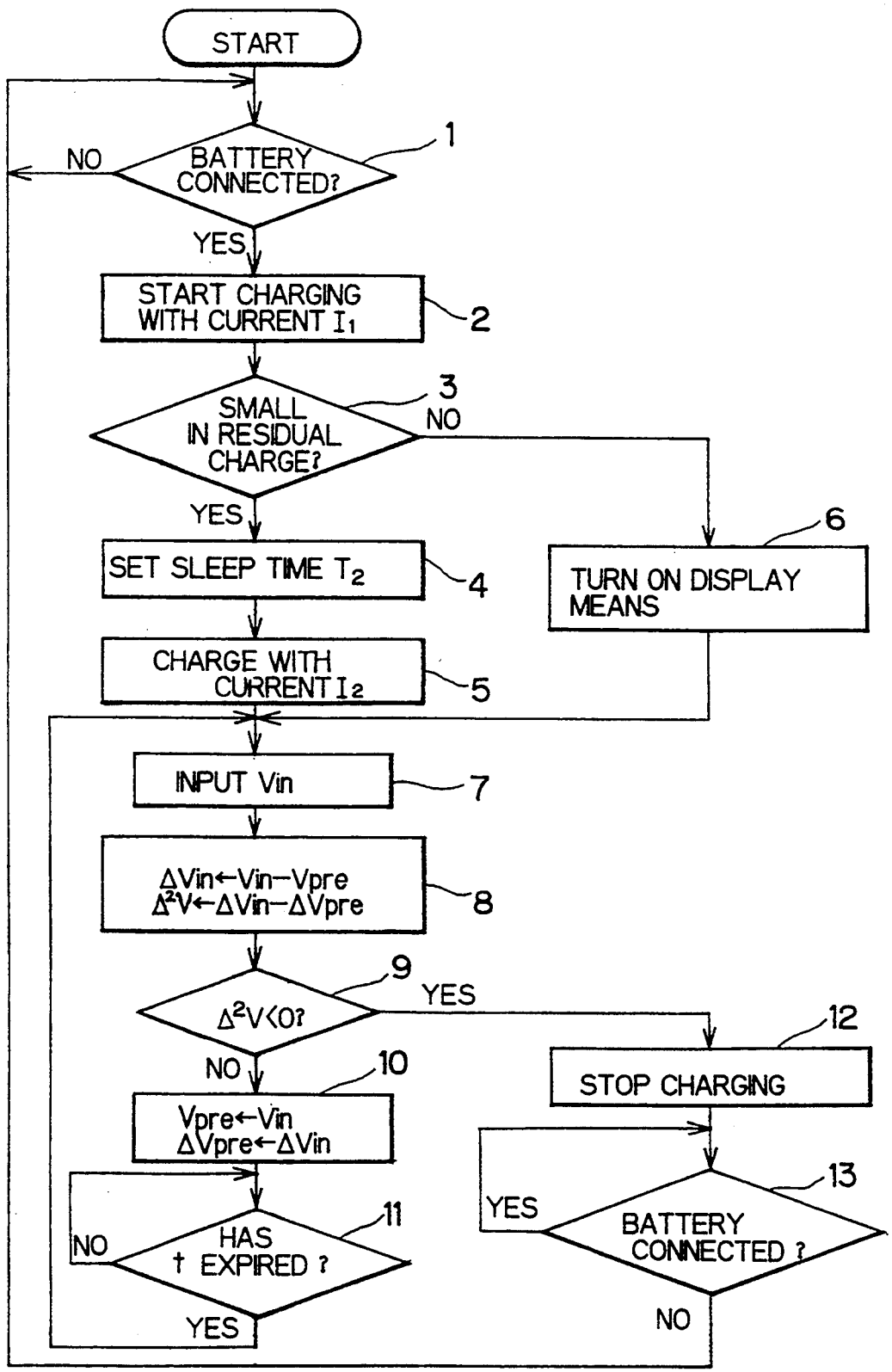
FIG. 2 is a flow chart for describing an operation of a first embodiment of the present invention.
Figure 11:
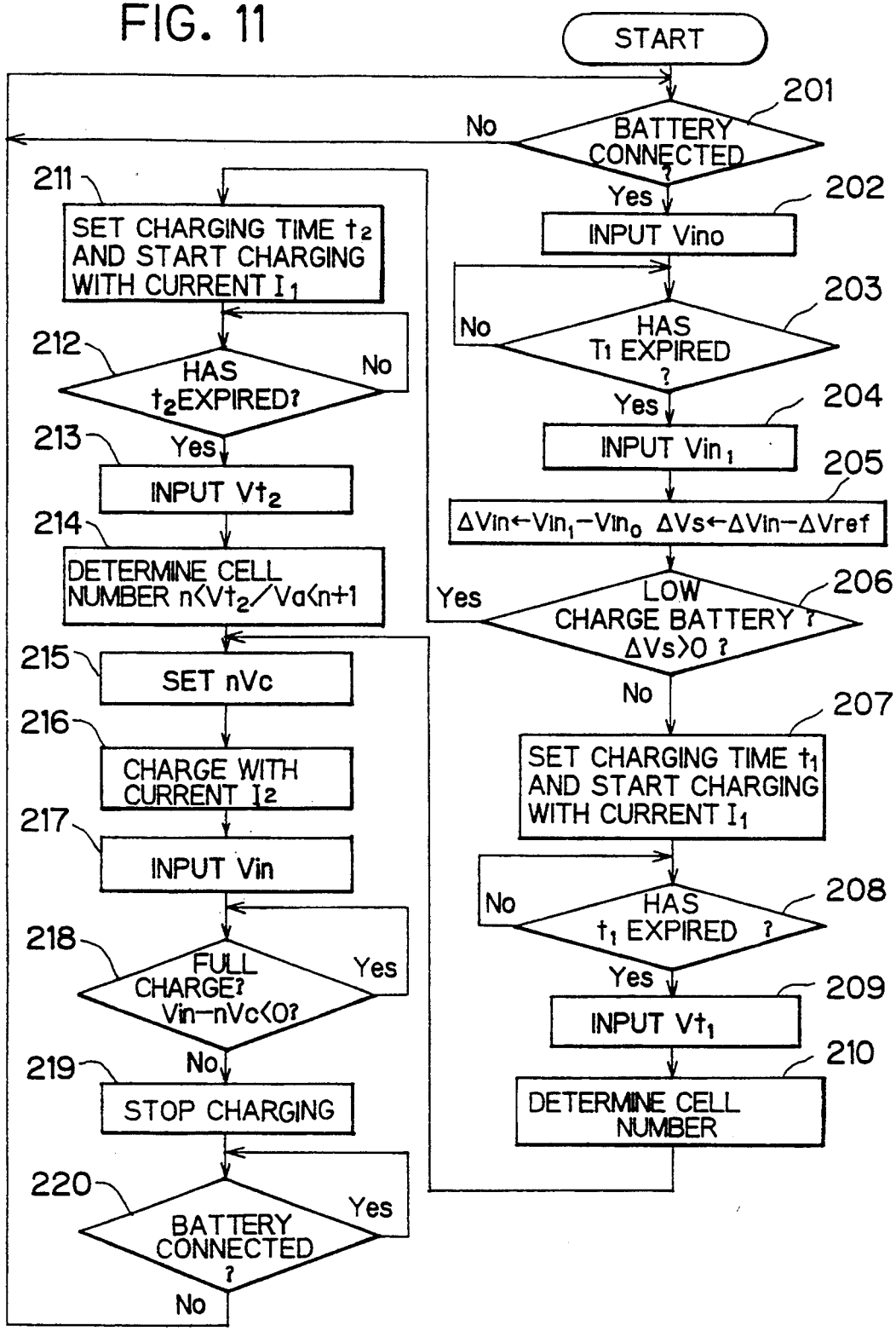
FIG. 11 is a flow chart for describing an operation of a third embodiment of the present invention.

The third embodiment uses the same hardware arrangement shown in FIG. 1. The flow chart of the third embodiment is shown in FIG. 11 which is similar to the flow chart shown in FIGS. 7A and 7B. Steps 201 through 206 are identical to steps 101 through 106, respectively, thus the description is not necessary. Further, the cell number identification procedures (steps 207 through 210) are also identical to steps 107 through 110, respectively.

After the cell number is identified, a cut-off voltage n$V_c$ corresponding to the cell number is set (step 215). When the battery voltage has reached the cut-off voltage, the battery is judged to be in a full charge condition and thus the charge is stopped. Further, the charging current is increased to a higher level $I_2$ (step 16).

When ΔVs is judged to be positive in step 206, then the battery 2 is determined to have been deeply discharged. Setting a longer preliminary charge time $t_2$ ($t_2>t_1$), charging of the battery 2 is started with the charging current $I_1$ (step 211). After expiration of the preliminary charge time $t_1$ (step 212), the battery voltage $V_{f2}$ is inputted (step 213) and the input battery voltage $V_{f2}$ is compared with each of a plurality of reference voltages $nV_a$ to determine the number (n) of cells making up of the battery 2 (step 214). Depending on the number of cells thus determined, a cut-off voltage $nV_c$ is set (step 215) and the charging current is increased to $I_2$ (step 216).

Next, a procedure for detecting the full charge condition of the battery is executed. In this procedure, the output of the battery voltage detecting means 40 is read through the A/D converter 55 (step 217) and the battery voltage Vin detected is compared with the cut-off voltage $nV_c$. This comparison is continued until the subtraction of the cut-off voltage $nV_c$ from the battery voltage Vin turns to positive ("NO" in step 218). When the decision made in step 218 becomes "NO", then the microcomputer 50 issues a charge stop signal from its output port 56 to the PWM control IC 23 via the signal transmission means 4, thereby discontinuing the charging (step 219). Thereafter, upon confirming that the battery 2 is taken out (step 220), the program returns to step 201 to wait for another battery to be connected.

Figure 12:
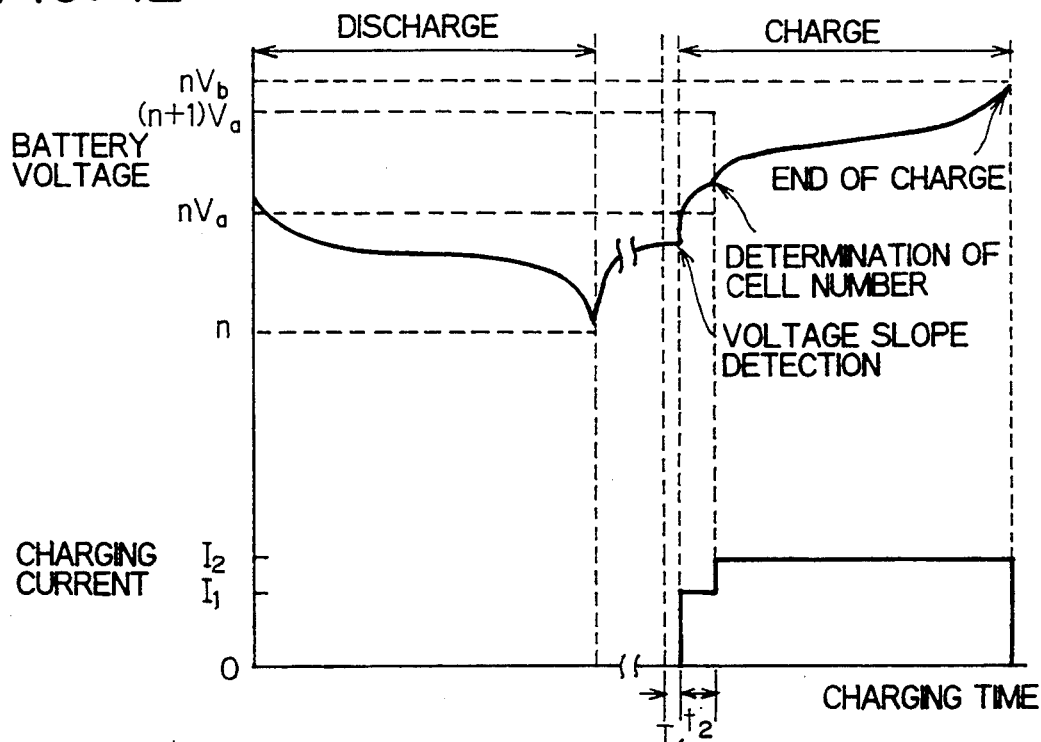
FIG. 12 is a graphical representation showing a charge/discharge characteristic of a battery of high charge according to the third embodiment of the present invention.
Figure 13:
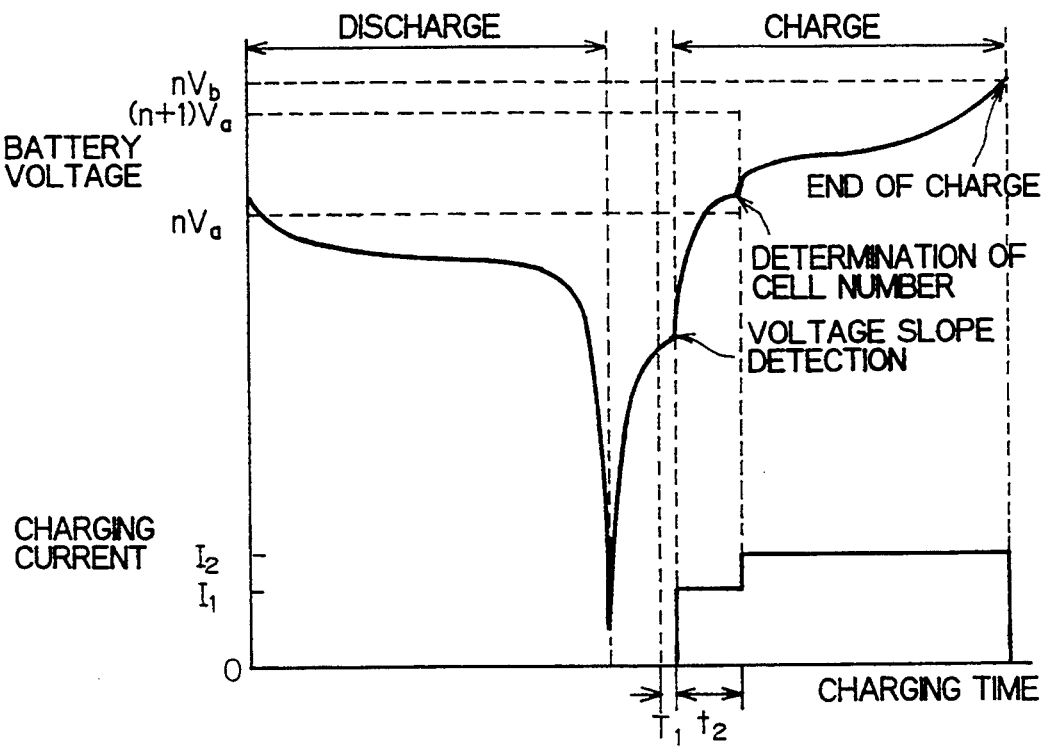
FIG. 13 is a graphical representation showing a charge/discharge characteristic of a battery of low charge according to the third embodiment of the present invention.

A charging characteristic curve of the battery which is discharged normally is shown in FIG. 12 and a charging characteristic curve of the battery which is deeply discharged is shown in FIG. 13.

Although the present invention has been described with respect to specific embodiments, it will be appreciated by one skilled in the art that a variety of changes and modifications may be made without departing from the scope of the invention. For example, certain features may be used independently of others and equivalents may be substituted all within the spirit and scope of the invention.

What is claimed is:

1. A battery charger for charging a rechargeable battery having a plurality of cells, comprising:

charge current supplying means for supplying a charge current to the battery;

voltage detecting means for detecting a voltage across the battery and for outputting a battery voltage signal indicative of the voltage across the battery;

battery status detecting means for detecting a status of the battery as to whether the battery is at low charge or at high charge, said battery status detecting means detecting the status of the battery based on a reference voltage and a first battery voltage signal indicative of the voltage across the battery at a time after expiration of a predetermined period of time from start of charge; and control means for controlling the charge of the battery base on the status of the battery detected by said battery status detecting means, said control means having full charge detection means for detecting that the battery has reached a full charge condition based on the voltage indicated by the battery voltage signal, wherein said control means stops charging when the full charge condition is detected by said full charge detection means;

wherein the reference voltage is a voltage across the battery detected by said voltage detecting means at the start of charge, and wherein said battery status detecting means computes a change in the voltage across the battery over the predetermined period of time and determines that the battery is at low charge when the change in the voltage across the battery is equal to or smaller than a predetermined value and that the battery is at high charge when the change in the voltage across the battery is larger than the predetermined value.

2. The battery charger according to claim 1, wherein said full charge detection means comprises computing means for computing a second order differential of the voltage across the battery as the charging proceeds and for outputting a computed result, and wherein said control means stops charging based on the computed result.

3. The battery charger according to claim 2, wherein said control means stops charging when the computed result is negative.

4. The battery charger according to claim 2, wherein said control means comprises sleep time setting means, said sleep time setting means setting a sleep time when the status of the battery is determined to be at low charge, said computing means being prohibited from computing the second order differential of the voltage during the sleep time, and wherein said control means stops charging when the computed result is negative after expiration of the sleep time.

5. The battery charger according to claim 2, wherein said control means controls said charge current supplying means to supply a first charge current to the battery during the predetermined period of time and to supply a second charge current higher in level than the first charge current to the battery when the status of the battery is determined to be at low charge.

6. The battery charger according to claim 5, wherein said control means further controls said charge current supplying means to continuously supply the first charge current to the battery when the status of the battery is determined to be at high charge.

7. The battery charger according to claim 2, wherein the reference voltage is a predetermined fixed value, and wherein said battery status detecting means determines that the battery is at low charge when the voltage indicated by the first battery voltage signal is lower than the predetermined fixed value and that the battery is at high charge when the voltage indicated by the first battery voltage signal is higher than the predetermined fixed value.

8. The battery charger according to claim 7, wherein the battery has a plurality of cells connected in series, and wherein said control means comprises cell number identification means for identifying a cell number, the predetermined fixed value being variable dependent on the cell number identified by said cell number identification means.

9. The battery charger according to claim 8, wherein said full charge detection means comprises computing means for computing a second order differential of the voltage across the battery as the charging proceeds and for outputting a computed result, and wherein said control means stops charging based on the computed result.

10. The battery charger according to claim 9, wherein said control means stops charging when the computed result is negative.

11. The battery charger according to claim 9, wherein said control means comprises sleep time setting means, said sleep time setting means setting a sleep time when the status of the battery is determined to be at low charge, said computing means being prohibited from computing the second order differential of the voltage during the sleep time, and wherein said control means stops charging when the computed result is negative after expiration of the sleep time.

12. The battery charger according to claim 8, wherein said control means controls said charge current supplying means to supply a first charge current to the battery during the predetermined period of time and to supply a second charge current higher in level than the first charge current to the battery when the status of the battery is determined to be at low charge.

13. The battery charger according to claim 12, wherein said control means further controls said charge current supplying means to continuously supply the first charge current to the battery when the status of the battery is determined to be at high charge.

14. The battery charger according to claim 8, wherein said full charge detection means comprises comparison means for comparing the voltage across the battery progressively increasing as the charging proceed with a cut-off voltage and outputting a comparison result, and wherein said control means stops charging when the comparison result indicates that the voltage across the battery has reached the cut-off voltage.

15. The battery charger according to claim 14, wherein the cut-off voltage is variable dependent on the cell number identified by said cell number identification means.

16. A battery charger for charging a rechargeable battery having a plurality of cells, comprising:
   charge current supplying means for supplying a charge current to the battery;
   voltage detecting means for detecting a voltage across the battery and outputting a battery voltage signal indicative of the voltage across the battery;
   first battery status detecting means for detecting a status of the battery as to whether or not the battery has been deeply discharged, said battery status detecting means detecting the status of the battery based on a reference voltage and a first battery voltage signal indicative of the voltage across the battery at a time before the charge current is supplied to the battery by said charge current supplying means;
   second battery status detecting means for detecting a status of the battery as to whether the battery is at low charge or at high charge, said battery status detecting means detecting the status of the battery based on a reference voltage and a second battery voltage signal indicative of the voltage across the battery at a time after expiration of a preliminary charge time from a start of charge;
   time adjusting means for adjusting a duration of the preliminary charge time in accordance with the status of the battery detected by said first status detecting means; and
   control means for controlling the charge of the battery based on the status of the battery detected by said second battery status detecting means, said control means having full charge detection means for detecting that the battery has reached a full charge condition based on the voltage indicated by the battery voltage signal, wherein said control means stops charging when the full charge condition is detected by said full charge detection means.

17. The battery charger according to claim 16, wherein when said first status detecting means detects that the battery has not been deeply discharged, the preliminary charge time is set to a first duration, and when said first status detecting means detects that the battery has been deeply discharged, the duration of the preliminary charge time is set to a second duration longer than the first duration.

18. The battery charger according to claim 17, wherein said full charge detection means comprises computing means for computing a second order differential of the voltage across the battery as the charging proceeds and for outputting a computed result, and wherein said control means stops charging based on the computed result.

19. The battery charger according to claim 18, wherein said control means stops charging when the computed result is negative.

20. The battery charger according to claim 18, wherein said control means comprises sleep time setting means, said sleep time setting means setting a sleep time when the status of the battery is determined to be at low charge, said computing means being prohibited from computing the second order differential of the voltage during the sleep time, and wherein said control means stops charging when the computed result is negative after expiration of the sleep time.

21. The battery charger according to claim 17, wherein said control means controls said charge current supplying means to supply a first charge current to the battery during the predetermined period of time and to supply a second charge current higher in level than the first charge current to the battery when the status of the battery is determined to be at low charge by said second status detecting means.

22. The battery charger according to claim 21, wherein said control means further controls said charge current supplying means to continuously supply the first charge current to the battery when the status of the battery is determined to be at high charge by said second status detecting means.

23. The battery charger according to claim 17, wherein said full charge detection means comprises comparison means for comparing the voltage across the battery as the charging proceed with a cut-off voltage and for outputting a comparison result, and wherein said control means stops charging when the comparison result indicates that the voltage across the battery has reached the cut-off voyage.

24. The battery charger according to claim 23, wherein the cut-off voltage is dependent on the cell number identified by said cell number identification means.

* * * * *